United States Patent [19]

Gray, Jr.

[11] Patent Number: 4,600,044
[45] Date of Patent: Jul. 15, 1986

[54] METHOD AND APPARATUS FOR JOINING STAIR RAIL FITTINGS TOGETHER

[76] Inventor: John M. Gray, Jr., 216 Riverview Dr., Marion, Va. 24354

[21] Appl. No.: 725,701

[22] Filed: Apr. 22, 1985

Related U.S. Application Data

[62] Division of Ser. No. 525,915, Aug. 24, 1983.

[51] Int. Cl.$^4$ ............................................. B27M 3/00
[52] U.S. Cl. .................................. 144/372; 144/379; 144/216; 83/762; 269/295; 33/185 R
[58] Field of Search ............... 144/216, 217, 14, 15, 144/16, 18, 152, 153, 372, 379; 83/761, 762, 763, 764, 765, 766, 767, 648, 581; 269/295; 33/185 R

[56] References Cited

U.S. PATENT DOCUMENTS

| 952,270 | 3/1910 | Milks | 83/761 |
| 1,883,392 | 10/1932 | Moll | 144/136 R |
| 2,108,992 | 2/1938 | Obenshain | 83/762 |
| 2,741,282 | 4/1956 | Wieting | 144/136 R |
| 2,822,836 | 2/1958 | Horstmann et al. | 143/132 |
| 4,050,975 | 9/1977 | Draffone | 269/295 |
| 4,189,132 | 2/1980 | DiRusso | 269/295 |
| 4,218,947 | 8/1980 | Laviola | 83/762 |
| 4,244,102 | 1/1981 | Bolles | 30/27 B |

OTHER PUBLICATIONS

"Stair World–Coffman," 1982, pp. 21, 23.

Primary Examiner—Francis S. Husar
Assistant Examiner—Jorh M. Griffin
Attorney, Agent, or Firm—Fulbright & Jaworski

[57] ABSTRACT

A method and apparatus for joining fittings, particularly wooden stair rail fittings. The apparatus includes a mitre jig and a double slot jig. The mitre jig has a base with a curved bed for supporting the fitting to be cut. A wall is used with the base that has on it a scale for indicating the angle of incline of the stair being worked with. A recess in the wall accommodates a saw and a slot in the wall receives the saw blade. The fitting is placed on the base with its seam aligned with the particular indication for the stair's angle of incline. A saw is then used to cut the fitting. The double slot jig is used to cut slots into the ends of fittings for joining them. The double slot jig has a base, a tray, a double-bladed cutting apparatus, and a frame. The tray supports the fitting to be cut and is movable on the base. Appropriate stops are used to correctly position the fitting on the base and to limit the movement of the tray on the base. A drill with double circular blades can be used. It is mounted to the frame above the tray. The fitting to be cut is placed on the tray and the tray is moved on the base until the fitting contacts the double saw blades. The cutting proceeds until the tray contacts a stop block.

4 Claims, 19 Drawing Figures

CUT PIECE FROM GOOSENECK

CUT PIECE FROM GOOSENECK

METHOD AND APPARATUS FOR JOINING STAIR RAIL FITTINGS TOGETHER

This is a division of application Ser. No. 525,915, filed 8/24/83.

BACKGROUND OF THE INVENTION

1. Field of the Invention

The present invention relates to the field of joining wooden fittings and more particularly joining together stair rail wooden fittings.

2. Description of the Prior Art

A typical stair rail has a main body whose angle of slope is relatively constant throughout its length. However, at both the top and the bottom of the stairs, there are fittings with portions whose slope differs from the slope of the main body of the rail. In order to have a free flowing rail, the fittings at the top and at the bottom of the rail must be accurately cut to meet and mesh with the main body of the rail. The prior art method for accomplishing the cutting and the joining of stair rail fittings requires that a separate special tool, called a pitchblock be prepared for each stair rail.

As shown in FIG. 6, the pitchblock 3 is essentially a triangular template in which the hypotenuse of the right-angle triangle is called the "pitch line," the bottom horizontal side is referred to as the "run" side, and the vertical side is called the "rise" side. The angle between the pitch side and the run side corresponds to the angle of incline of the stair rail. The length of the run side corresponds to the unit run of the staircase being constructed. The length of the rise side corresponds to the unit rise of the staircase being constructed.

As shown in FIG. 2, the fitting for the stair rail at the bottom of the staircase is referred to as a "starting fitting" such as the starting fitting 1. In order to cut the starting fitting 1 so that a smooth joint can be made between the stair rail and the starting fitting, as shown in FIG. 3, the starting fitting is placed on a flat surface so that the level portion of the starting fitting lays substantially flat, as shown in FIG. 7 with the starting fitting 2. Then, as shown in FIG. 7, the pitchblock 3 is placed with the run side level on the flat surface and moved so that a point on the pitch side comes into contact with a point on the upturned portion of the starting fitting 2. At that contact point in order to scribe the line to be cut, the pitchblock is turned 90° so that the rise side is substantially level on the flat surface. The pitchblock is then moved so that the pitch side of the pitchblock is aligned with the mark made on the fitting as shown in FIG. 8. With the pitchblock in this position, a line is scribed along the fitting corresponding to the pitch side of the pitchblock. The starting fitting is then held securely and cut squarely on the line that has been scribed on the fitting. Since the pitchblock is originally fashioned to correspond to the particular rail and stairs being worked with, the starting fitting 2 as now cut will meet and mesh with the stair rail 6 main body in a smooth free-flowing manner as shown in FIG. 3.

As shown in FIGS. 1 and 4, the fitting to be joined to the top of the main body of the stair rail is commonly referred to as "gooseneck fitting." As shown in FIG. 5, since a gooseneck fitting is at the top of the stairway, the angle at which it is cut is equal to the complement of the angle of incline of the stair rail. According to the prior art method, in order to achieve this cut accurately, the pitchblock is used in a similar fashion, but initially the rise side of the pitchblock, as shown in FIG. 9, is placed on the flat surface to mark a point of contact between the pitchblock and the curved portion of the gooseneck fitting 4. Once the point of contact has been marked, the run side of the pitch block is placed on the flat surface, as shown in FIG. 10, and the pitchblock is moved to a position such that the pitch side of the pitchblock coincides with the point of contact marked on the fitting. At this point a line is scribed on the fitting using the pitch side of the pitchblock as a ruler. The gooseneck fitting is then taken and held securely and cut squarely on the line which has been scribed on it. It should then mesh and join smoothly with the rail 5 as shown in FIG. 4.

There are numerous problems associated with the prior art method and apparatus scribed above. The method requires a fairly sophisticated, capable, and well-trained craftsman. It requires numerous precise measurements and operations. Since the desired end result is a smooth joining of the fitting to the rail, even a small error in measurement or marking can result in an unacceptable result. The method requires a separate pitchblock for each particular stair rail; and, although, there is a normal range of angles of incline for stair rails, usually 30° to 37°, there is an infinite variety of stair rail angles within the 30° to 37° range. Also, even in the unlikely event that a craftsman has a set of pitchblocks that accommodates the 30° to 37° range, if he is confronted by an unusual angle of incline outside of this range, he must develop a new pitchblock on the spot. Further competence and accuracy is required to perform the separate step of holding and cutting the fitting once it has been marked.

SUMMARY OF THE INVENTION

The present invention is directed to a method and apparatus for joining stair rail fittings in an efficient, accurate and precise manner. The present invention provides a method which employs a mitre jig for facilitating the cutting of stair fittings and a double-slot jig for accurately providing slots in fittings for joining them.

Both gooseneck fittings used at the top of a stairway and starting fittings used at the bottom of a stairway generally have a curved portion which originally is a piece separate and apart from the rest of the fitting. The curved portion generally is either joined or glued at a seam to the rest of the fitting. This is done in a manner that is generally uniform throughout the industry. This is important since the seam can be used as an indexing mark. Although heretofore the existence of this seam has been taken for granted, it has been realized in the present invention that the uniform location of this seam is an important feature that can be used as an indexing mark to achieve a desired cut of a fitting.

According to the present invention, a mitre jig is provided which has a curved base to support and accommodate the curved portion of a fitting. The curve of the support corresponds to the curve of the fitting. A wall is provided in association with the curved base. The wall has a slot for receiving and guiding the saw that will cut the fitting and it also has a chart provided on it that indicates a range of angular stair rail slopes. Once the operator knows the angle of slope of the rail, he simply lines up the seam on the fitting with that angle as indicated on the chart. Holding the fitting securely on the base, he then cuts the fitting through the slot provided in the wall. The resulting cut is accurate and precise and will permit the smooth meshing of the cut fitting with the main body of the stair.

According to the present invention, in order to provide for the efficient joining of the cut fitting to the main body of the stair rail, another jig is provided which cuts double interior slots in both the main body of the stair rail and in the cut fitting. This double slot jig includes a tray for holding the fitting that is going to be cut and a base which supports the tray and on which the tray is movable. Mounted above the base and the tray is a saw when the tray is moved on the base, the fitting on the tray moves into cutting contact with the spaced apart saw blades. Appropriate stops are provided allowing the tray to move a specified distance so that the double-saw blades make a double-slot cut in the fitting or rail to a predetermined depth. The double-slot cuts in the fitting and in the rail are the same and when the two items are placed end to end, appropriate brads or joint nails can be easily driven into the double slots effectively joining the two pieces.

According to the present invention, no marking or scribing of the fitting is required, nor does the operator need to move the fitting from the mitre jig to cut it. The mitre jig can be used with a large variety of currently available fittings and it can be used with hand mitre saws, and table saws. Use of the method and apparatus of the invention reduces cost by reducing the labor required to install stairways and also by reducing waste associated with improperly cut fittings.

It is therefore an object of the present invention to provide a novel, efficient, and effective method for cutting stair fittings.

A further object of the present invention is the provision of a novel, efficient and precise method for providing double-slot cuts in fittings for joining them.

A still further object of the present invention is the provision of a mitre jig for facilitating the precise cutting of a fitting to be joined with a stair rail.

Another object of the present invention is the provision of a jig for facilitating the double-slot cutting of both stair rail and stair rail fittings.

DESCRIPTION OF THE PREFERRED EMBODIMENT

Figure 16:
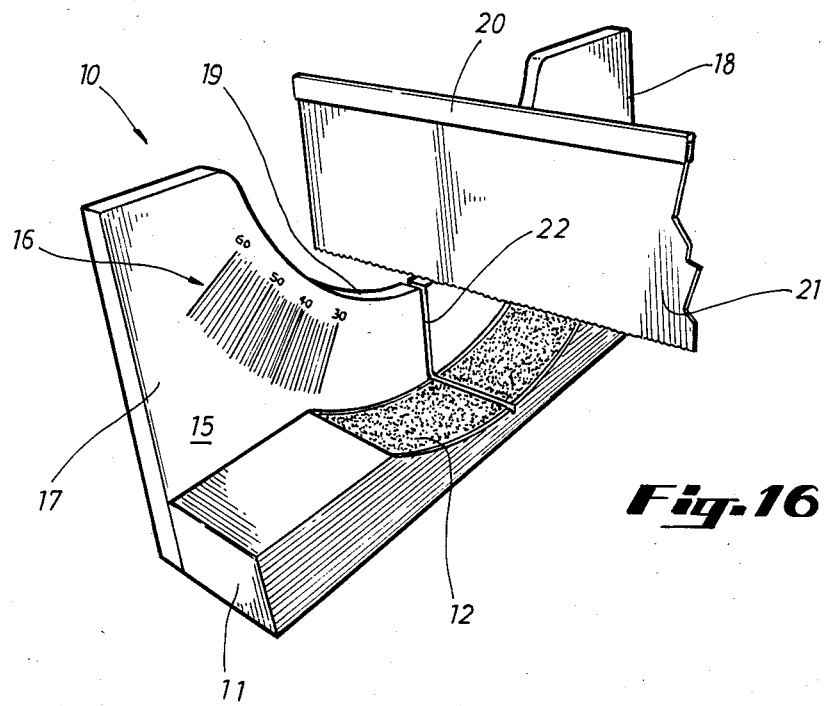
FIGS. 16-19 are perspective views of a mitre jig according to the present invention.
Figure 17:
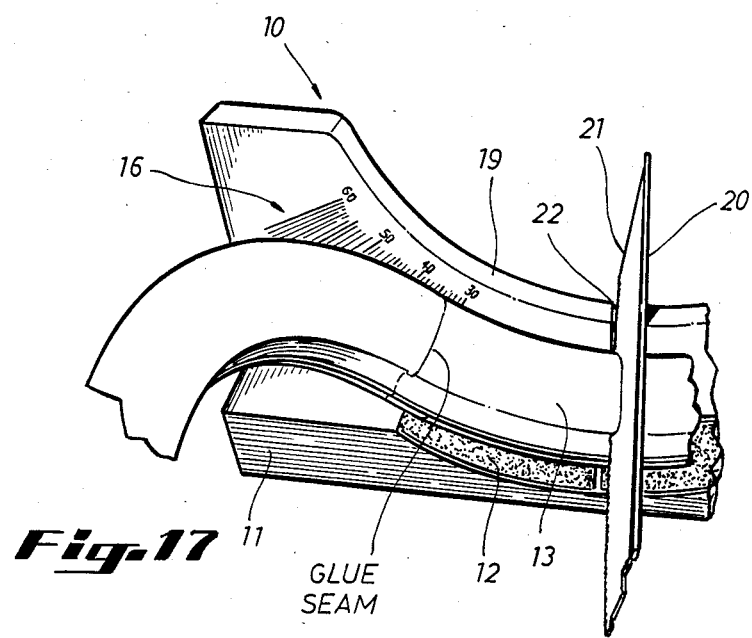
Figures 18, 19:
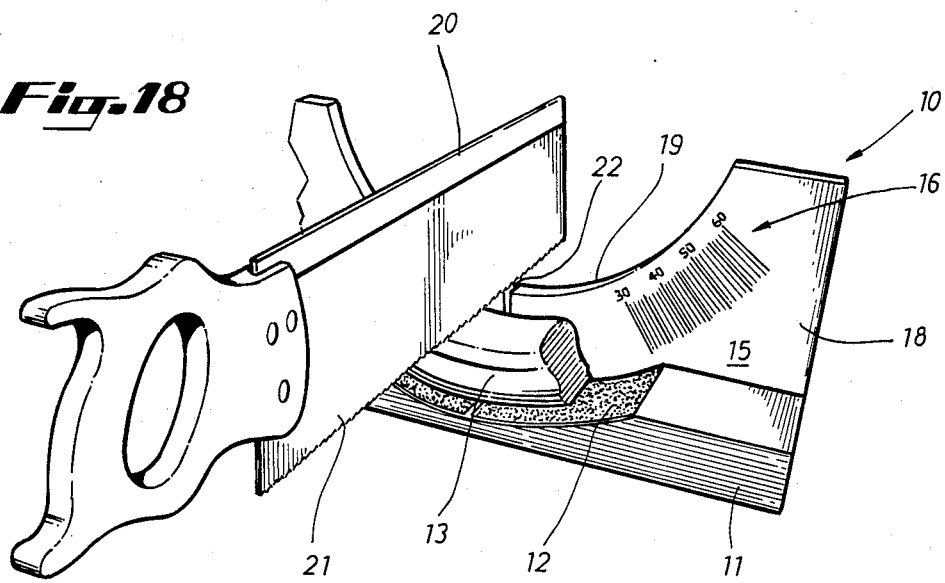

As shown in FIG. 16 (and as shown pictorially in corresponding photograph 15), the mitre jig 10 according to the present invention has a base support 11 which has a curved part 12. The curved part 12 is fashioned so that the curve of the curved part 12 smoothly accommodates the curved portion 13 of a starting fitting, as shown in FIG. 17, or the curved portion 14 of a gooseneck fitting, as shown in FIG. 19. The curvature of these fittings is generally standard throughout the industry so that a suitable base support can be supplied with a curve that will match the curves of the fittings.

The wall 15 is connected to the base support 11. Although this is the preferred embodiment, if the wall 15 is merely disposed adjacent the base support 11, its function will be accomplished. The wall 15 has angle scale indicator means 16 with angle indications corresponding to angles of incline for stairs. It is usually the case that the angle of incline of a normal stairway is in the range of approximately 30°-37°.

Figure 4:
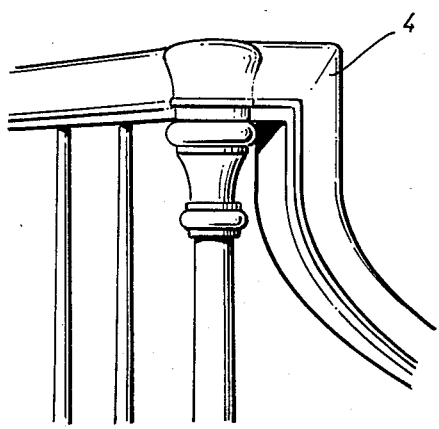
FIG. 4 is a side view of the top of a stair rail with a gooseneck fitting.
Figure 1:
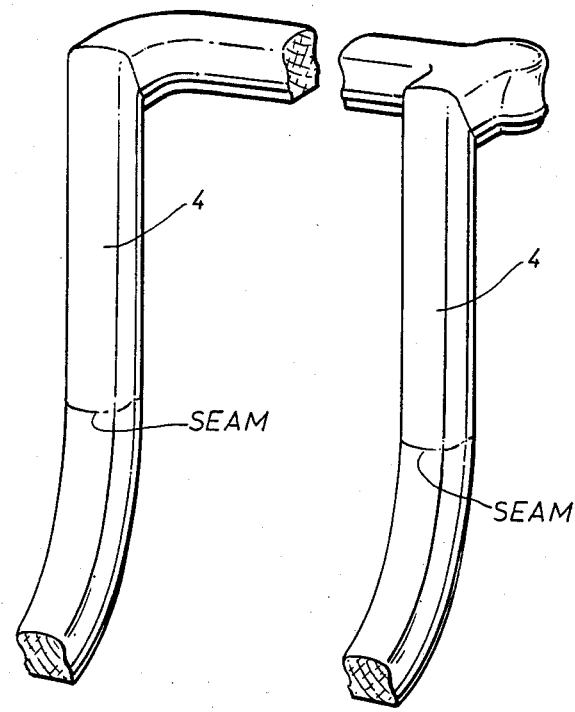
FIG. 1 is a side perspective view of typical gooseneck fittings with the ends cut away.
Figure 3:
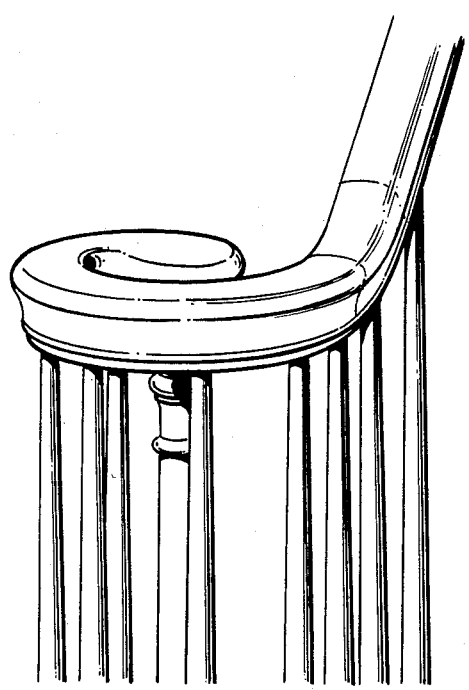
FIG. 3 is a perspective view of the bottom of a stair rail with a starting fitting.
Figure 2:
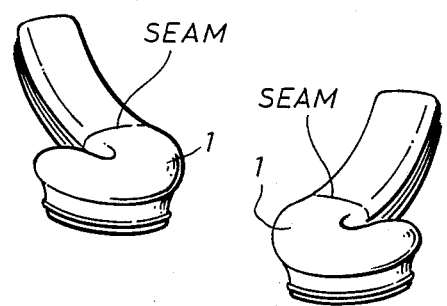
FIG. 2 is a side perspective view of typical starting fittings.
Figure 5:
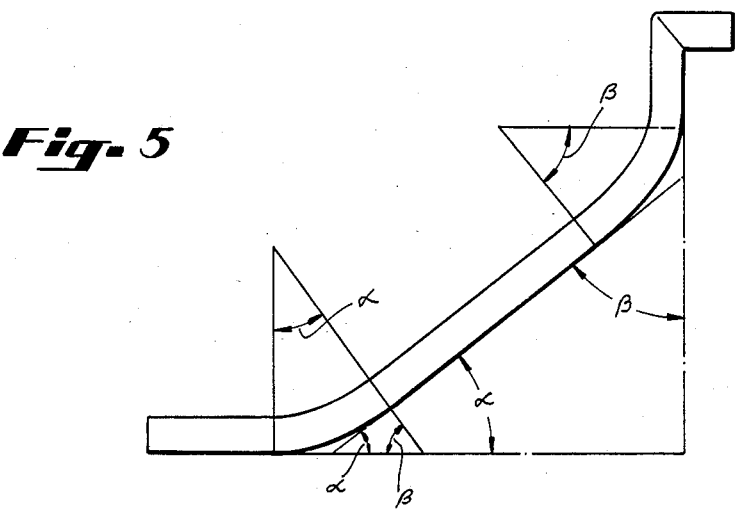
FIG. 5 is a diagram showing the various angles of interest of a stair rail.
Figure 6:
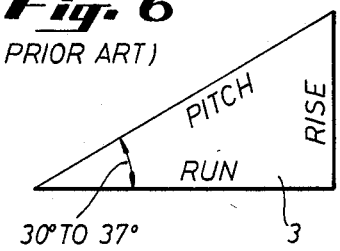
FIG. 6 is a diagram of a pitchblock.
Figure 7:
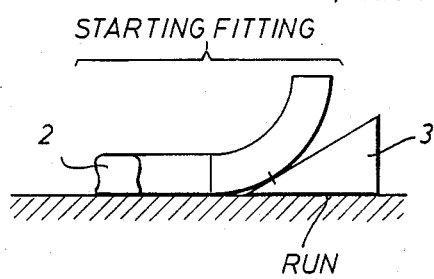
FIGS. 7-10 show schematically the use of a pitchblock.
Figure 8:
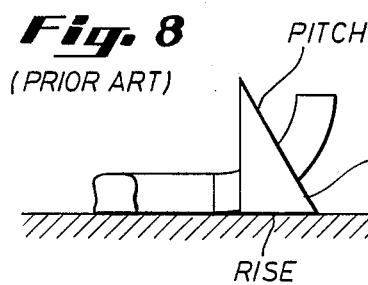
Figure 9:
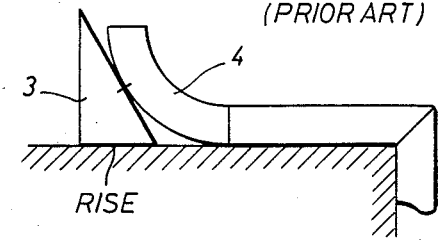
Figure 10:
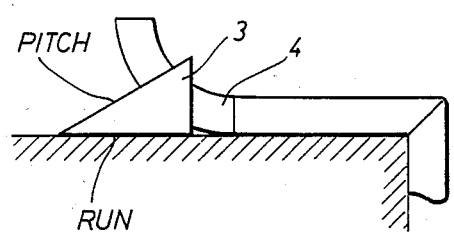
Figure 11:
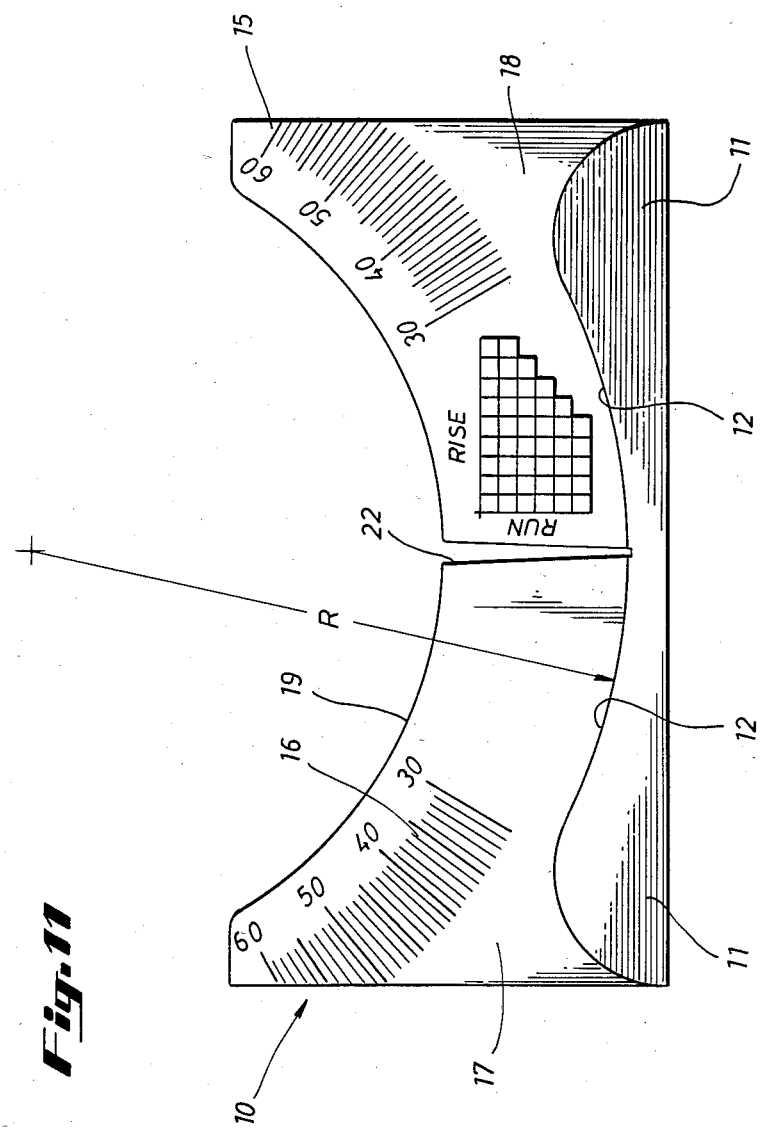
FIG. 11 is a front view of a mitre jig according to the present invention.

As shown in FIGS. 11 and 19, the wall 15 of the mitre jig 10 has two sides, 17 and 18. The recess 19 is formed integrally of the sides 17 and 18 for accommodating the saw or mitre saw to be used with the jig as shown in FIG. 16. To accommodate the blade of the saw, a slot is provided between the walls 17 and 18. As shown in FIG. 16, the saw 20 is used by positioning it in the recess 19 so that the blade 21 of the saw will be accommodated by the slot 22 while the blade 21 is cutting the fitting positioned on the base support 11.

The curved part 12 of the base support 11 extends from the sidewall 17 to the sidewall 18 and each of the sidewalls has a scale angle indicator means 16. Dual scales are provided because of the nature of the direction of the curves of the starting fittings and the gooseneck fittings. As shown in FIG. 17 (and corresponding photograph 16), the left side of the mitre jig 10 including the left sidewall 15 is used for positioning a starting fitting for cutting. As shown in FIG. 19 (and in corresponding photograph 18) the right side with its corresponding scale angle indicator means 16 is used for positioning and cutting a gooseneck fitting.

The accurate positioning of the fittings can be accomplished by using the seam between the flat or straight portion of the fittings and the curved portion of the fittings. The location of the seam is generally standard in the industry. Therefore, this seam location can be used as an index point for accurately positioning the fittings with respect to the angle scale indicator means 16. To simplify the operator's task, as shown in FIG. 11, a chart can be provided on the wall 15 which indicates runs and rises that the operator will be working with. By knowing the run and the rise of the particular stair, the operator can read the angle of incline directly from the chart.

To cut a starting fitting, the operator who already knows the run and rise of the stair being worked with, reads the angle of incline from the chart as shown in FIG. 11. He then places the starting fitting so that its curve substantially conforms with the curve of the curved part 12 of the base support 11 as shown in FIG. 17 and in FIG. 18 (and its corresponding photograph 17). He then aligns the seam of the fitting with the correct angle on the scale angle indicator means 16. Then, holding the fitting securely in position on the base support 11, he moves the mitre saw 20 to cut the fitting. As shown in FIG. 19, the procedure to cut a gooseneck fitting is similar; however, the angle is determined by subtracting the angle of incline from 90°. Generally the correct angle for cutting a gooseneck fitting will lie in the range of approximately 50°-60°. Photographs 8, 9, 10 and 11 show the conventional joining of two straight fittings which have had double slots cut in them.

Figure 14:
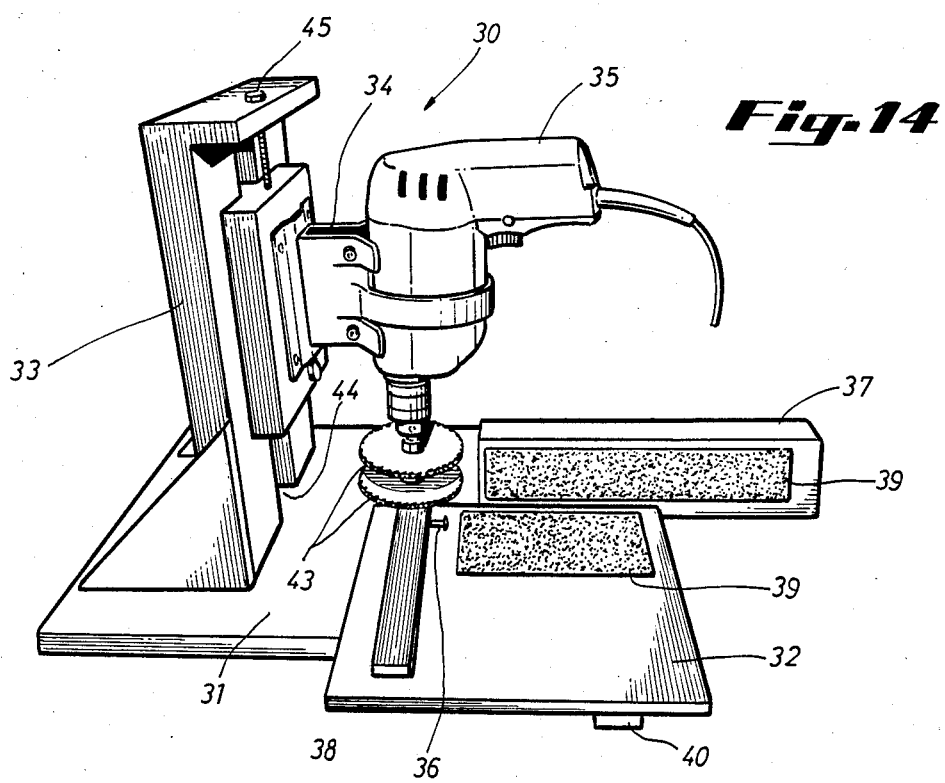

The double-slot jig 30 according to the present invention has the base 31, the tray 32 movably disposed on the base 31, the mounting frame 33 positioned near the base 31 and the drill 35 mounted by drill mount 34 to the mounting frame 33. The base 31 with the tray 32 are positioned with respect to the drill 35 so that when the tray 32 is moved on the base 31, the fitting 46 located on the tray 32 is moved into cutting relation with the blades 43 shown in FIG. 14 (and its corresponding photograph 2) which are connected to the saw 35.

Figure 13:
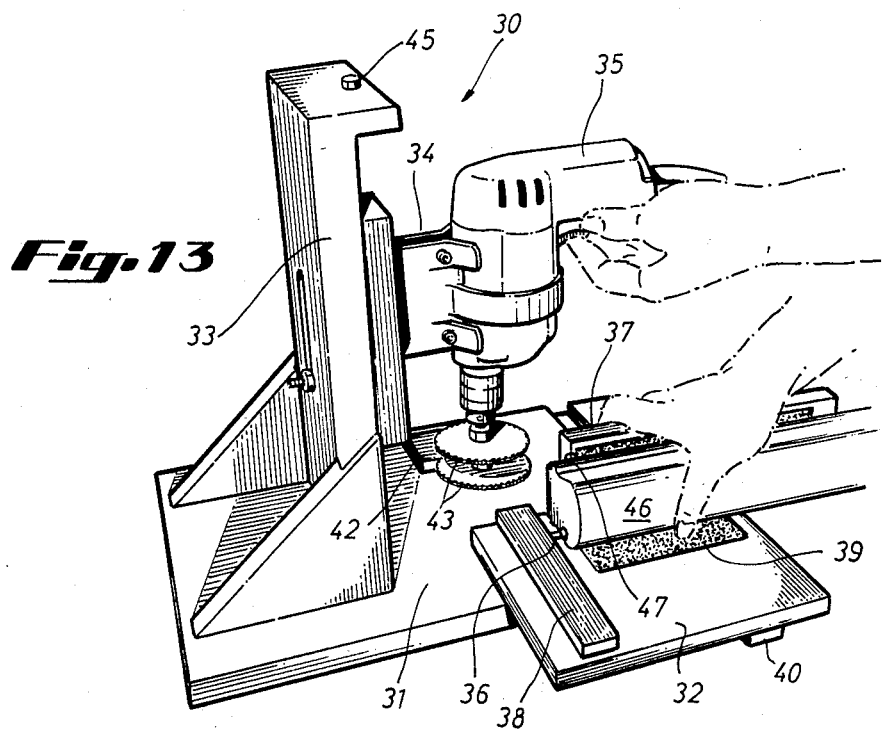
Figure 15:
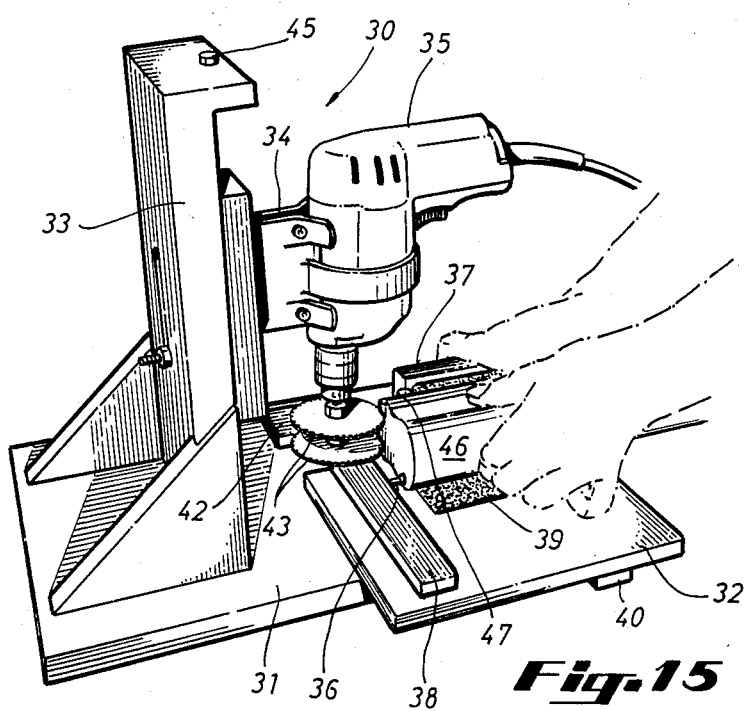

Various stops are provided on the double-slot jig so that the blades 43 cut to only a desired depth in the fitting end of the fitting 46. The positioning screw 36 is connected to the stop 38. The screw 36 abuts against the end of the fitting 46 as shown in FIGS. 13 (and its corresponding photograph 3) and 15 (and its corresponding photograph 4). The end tray stop 38 is connected to the tray 32. The side tray stop 37 is connected to the tray 32 and is used to hold the fitting 46 correctly in position on the tray 32. Sandpaper 39 may be applied to the surface of the tray 32 and to the side surface of the side tray stop 37 to make it easier to hold the fitting 46 in position as the tray 32 is moved.

Accurate movement of the tray 32 on the base 31 is provided by means of the guide recess 41 in the base 31 and the tray guide bar 40 connected to the tray 32. As the tray 32 is moved, the tray guide bar coacts with the guide recess 41 so that the tray guide bar moves in the recess 41 thereby guiding the tray 32 correctly and accurately so that the fitting 46 is cut precisely.

Although it should be understood that any double-saw blade mechanism can be used, in the preferred embodiment disclosed herein the drill 35 is employed with double circular saw blades 43 connected to the drill. The mounting frame 33 holds the drill 35 in appropriate relation to the fitting to be cut. Fittings cut with this double-slot jig can be easily joined together with conventional connectors and tools (shown in photographs 8, 9, 10 and 11).

To make it easier to cut a curved fitting on the double slot jig 30 according to the present invention, the side tray stop 37 can be provided with a curved portion similar to the curved part 12 of the base support 11 of the mitre jig 10 as described above. Using such a curved side tray stop will make it much easier to hold the fitting correctly as the tray 32 is moved across the base 31 to cut the fitting.

Figure 12:
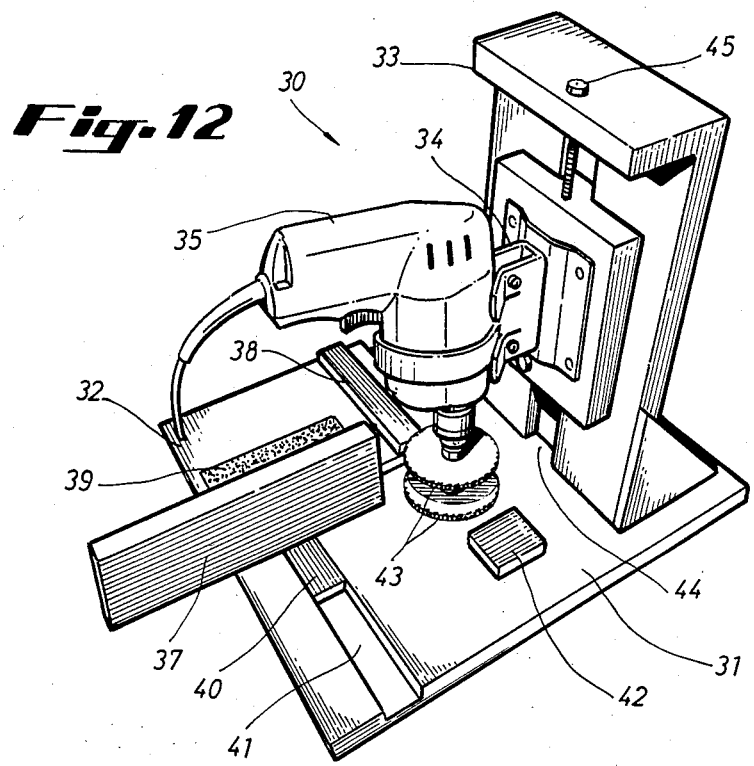
FIGS. 12-15 are perspective views of a double slot jig according to the present invention.

To cut a fitting using the double-slot jig 30, the operator places the fitting 46 on the tray 32 so that the end of the fitting 46 contacts the positioning screw 36 and so that the base 47 of the fitting 46 contacts the side surface of the side tray stop 37 thereby ensuring that the fitting is correctly positioned on the tray 32. The tray 32 is then moved toward the double saw blades 43 so that they contact and cut the fitting 46. The tray 32 is moved until it contacts the stop block 42 shown in FIG. 12 (and its corresponding photograph 1). At this point the saw blades have cut the fitting 46 to the desired depth. The operator then moves the tray 32 so that the tray 46 moves away from the blades 43. The fitting thus cut can be easily joined with another fitting cut similarly.

What is claimed is:

1. A miter jig for use with a saw for facilitating the cutting of a curved stair rail fitting for an inclined stair, the jig including base means for supporting the fitting to be cut, said base means having two flat shoulders formed integrally thereof within the same plane, and a curved bed formed integrally thereof between the shoulders, the curved bed forming a recess below the plane of the shoulders, the bed curved to conform to the curve of the fitting to be cut, wall means disposed adjacent to said base means, said wall means having slot means therein for receiving the saw as it cuts through the fitting, and scale indicator means disposed adjacent said base means, said scale indicator means indicating a range of possible angles of incline for stair rails and disposed so that the fitting to be cut can be positioned on the jig by placing it in desired relation to the scale indicator means.

2. The jig of claim 1 wherein the wall means is connected to the base means, the scale indicator means is connected to the base means, the scale indicator means is positioned on the wall means and is curved to conform with the curve of the curved bed of the base means.

3. A mitre jig for use with a saw for facilitating the accurate cutting of a curved stair rail fitting for an inclined stair, the jig including base means for supporting the fitting to be cut, said base means having two flat shoulders in the same plane formed integrally thereof and having a curved bed formed integrally therein between the two shoulders, the curved bed forming a recess below the plane of the shoulders, the curve of which conforms to the curve of the fitting, wall means connected to the base means, said wall means having slot means for receiving the saw as it cuts through the fitting, scale indicator means on said wall means for indicating a range of possible angles of incline of stair rails, said scale indicator means being curved to conform with the curve of the curved bed of the base means and said scale indicator means disposed so that the fitting to be cut can be positioned on the base means by placing it in desired relation to one of the angle of incline indicators of the scale indiator means.

4. A process for accurately cutting a curve of stair rail fitting for an inclined stair rail, the process including the steps of placing the stair rail fitting to be cut on base means having a curved bed formed integrally therein between and below two flat shoulders formed integrally of the base means so that the curved portion of the fitting rests on the curved bed, the curved bed conforming to the fitting's curve, positioning the fitting on the curved bed by aligning the point on the fittings where the curved portion begins with a point on scale indicator means provided adjacent base means which point corresponds to the angle of incline of the rail, and sawing through the fitting with saw means which are received as cutting proceeds in slot means provided in wall means connected to the base means.

* * * * *